(12) United States Patent
Chaudhri

(10) Patent No.: US 7,761,811 B1
(45) Date of Patent: Jul. 20, 2010

(54) USER INTERFACE FOR ASSISTING IN THE INSTALLATION OF AN ASSET

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 897 days.

(21) Appl. No.: 10/874,829

(22) Filed: Jun. 22, 2004

(51) Int. Cl.
*G06F 17/28* (2006.01)

(52) U.S. Cl. .................. 715/835; 715/269; 715/808; 715/810

(58) Field of Classification Search ............. 715/542, 715/269
See application file for complete search history.

(56) References Cited

U.S. PATENT DOCUMENTS

| 6,160,554 | A  | * | 12/2000 | Krause | 715/804 |
| 6,826,728 | B1 | * | 11/2004 | Horiyama | 715/210 |
| 7,539,939 | B1 | * | 5/2009 | Schomer | 715/269 |
| 2002/0194261 | A1 | * | 12/2002 | Teshima | 709/203 |
| 2003/0131321 | A1 | * | 7/2003 | Teshima | 715/542 |
| 2004/0098419 | A1 | * | 5/2004 | Bantz et al. | 707/203 |
| 2005/0080839 | A1 | * | 4/2005 | Kuwata et al. | 709/200 |

OTHER PUBLICATIONS

Dafont.com/faq, How to install Fonts [retrieved from http://www.dafont.com/faq.php]; Feb. 12, 2009.*

* cited by examiner

*Primary Examiner*—Weilun Lo
*Assistant Examiner*—Kim-Lynn Dam
(74) *Attorney, Agent, or Firm*—Adeli & Tollen LLP

(57) ABSTRACT

Some embodiments of the invention provide a method that assists in the installation of an asset in a graphical user interface for a computer system. The method receives a selection of the asset that has not yet been installed on the computer system. It then responds to the selection of the asset by displaying a preview of the asset without installing the asset on the computer system. In some embodiments, the method receives a modification of an attribute of the asset. It then responds to the modification of the attribute of the asset by displaying a preview of the modification of the attribute of the asset without installing the asset on the computer system. In some embodiments, the preview of the asset is used to assist in the determination of whether to install the asset.

47 Claims, 8 Drawing Sheets

USER INTERFACE FOR ASSISTING IN THE INSTALLATION OF AN ASSET

FIELD OF THE INVENTION

The present invention relates to a user interface for assisting in the installation of an asset.

BACKGROUND OF THE INVENTION

Computer systems come packaged and pre-installed with a variety of fonts. In most instances, users will find the fonts that they want already installed on their computer system. However, there may be times when users need a particular type of font that is not installed on the computer system. In such a case, users can typically find fonts elsewhere and install it on their computer system. There are numerous ways for users to find and retrieve fonts for their computer system. For example, users can find fonts on a website and download it to their computer system.

Once the font has been retrieved to their computer system, a user can install the font on his computer system. In most cases, the user must copy the font into the right folder in order to install the font on the computer system. Therefore, if the user does not know where to copy the font, then he will be unable to install the retrieved font. Another drawback of the current font installation method is that users are unable to preview the retrieved font until it has been installed on the computer system. In some instances, it may be possible that users inadvertently retrieved the wrong font. Under current font installation methods, users will not know that they downloaded the wrong font until they install the font on their computer system. Once they figure out that a wrong font has been installed, then they have to uninstall the font.

Therefore, there is a need for a better way of installing fonts on a computer system. Specifically, there is a need for way for installing fonts on a computer system without having to manually copy the font to a folder. Additionally, there is a need for a way for previewing a font, before installing the font on the computer system. Ideally, this technique can be used to install other types of assets.

SUMMARY OF THE INVENTION

Some embodiments of the invention provide a method that assists in the installation of an asset in a graphical user interface of a computer system. The method receives a selection of the asset that has not yet been installed on the computer system. It then responds to the selection of the asset by displaying a preview of the asset without installing the asset on the computer system. In some embodiments, the method receives a modification of an attribute of the asset. It then responds to the modification of the attribute of the asset by displaying a preview of the modification of the attribute of the asset without installing the asset on the computer system. In some embodiments, the preview of the asset is used to assist in the determination of whether to install the asset.

DETAILED DESCRIPTION OF THE INVENTION

Figure 1:
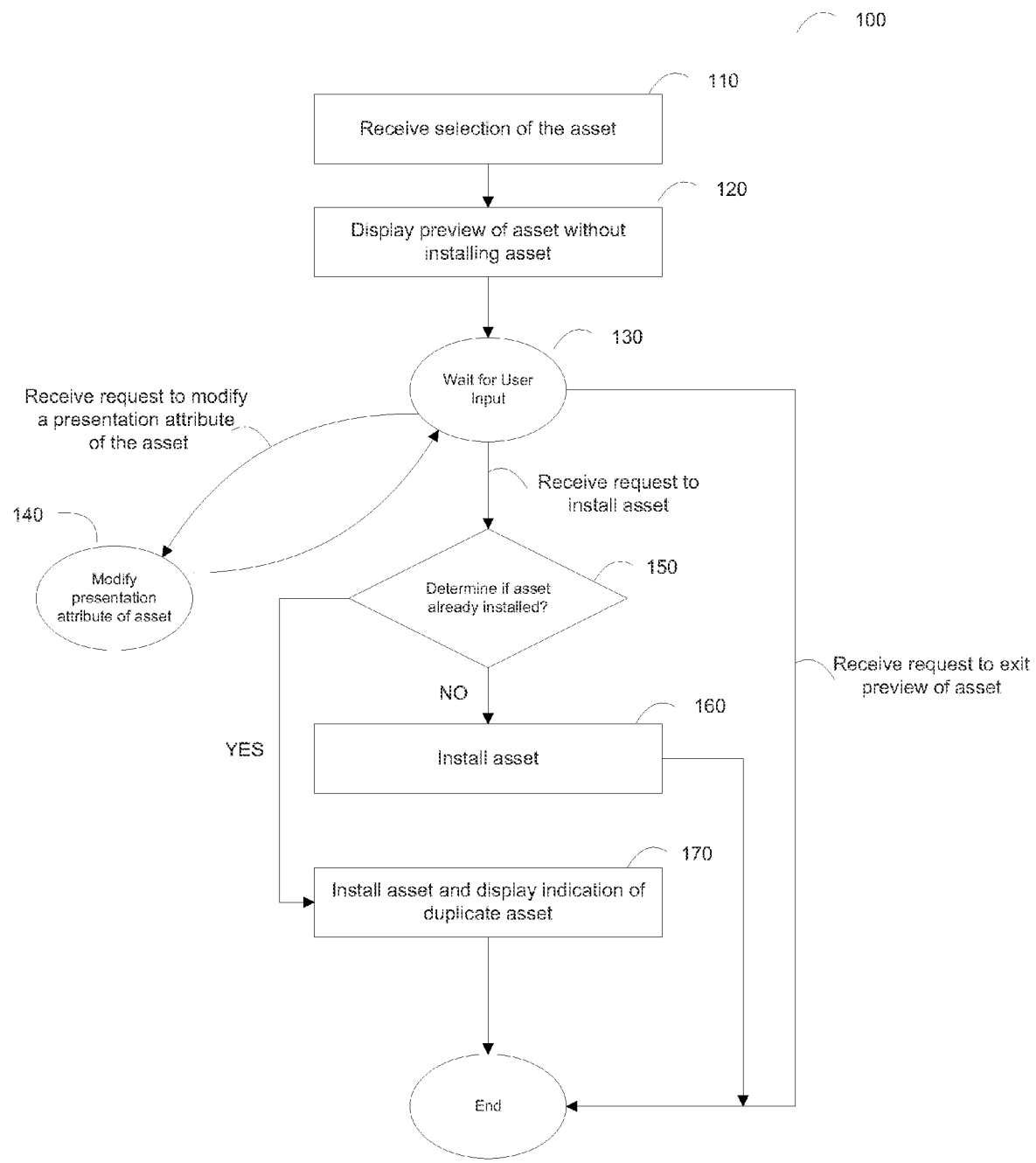
FIG. 1 illustrates an event-flow process of several embodiments of the invention.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

I. DEFINITIONS

A graphical user interface ("GUI") is an interface of a computer system that allows users to interact with the computer system through images and text. A GUI allows users to interact with the computer system in an intuitive graphical manner. Instead of learning and writing complex command languages, users can perform many operations by simply interacting with the visual components of a GUI, which are often easy to understand. A GUI often includes a cursor pointer, icons, desktop, windows, etc. The cursor pointer (the "cursor") is a pointer that a user can move across the GUI through the operation of a cursor controller, such as a mouse, a trackpad, trackball, etc. A user can use the cursor to select objects in the GUI. For instance, the user can select an object by dragging the cursor to the object and perform a click operation (e.g., through a button of the cursor controller):

Icons are examples of selectable objects in a GUI. Icons are used to represent folders, files, commands, etc. in the GUI. An icon can be represented by a text component, an image component, or both text and image components. The desktop refers to the contents on a display screen below any windows. A window is an area on the display screen that displays its own file, message, application, etc. independently of other windows that are displayed on the display screen.

II. OVERVIEW

Some embodiments of the invention provide a method that assists in the installation of an asset in a graphical user interface for a computer system. The method receives a selection of the asset that has not yet been installed on the computer system. It then responds to the selection of the asset by displaying a preview of the asset without installing the asset on the computer system.

In some embodiments, the method receives a modification of an attribute of the asset. It then responds to the modification of the attribute of the asset by displaying a preview of the modification of the attribute of the asset without installing the asset on the computer system. In some embodiments, the preview of the asset is used to assist in the determination of whether to install the asset.

In some embodiments, the method receives a request to install the asset. It then installs the asset on the computer system. An asset that is installed on the computer system is an asset that is available for use by a program or the operating system of the computer system. Accordingly, to install an asset, some embodiments perform a set of operations to make the asset available for use by the operating system and/or its applications.

The previewed and installed asset is a font in some embodiments. A font is typically a design for a set of text, numbers and/or characters. A font has various characteristics (attributes), such as typeface, size, spacing, and pitch, etc. Different embodiments install a font differently. For instance, in some embodiments, installing a font entails copying the font into an appropriate folder, e.g., a folder that contains other installed fonts.

Some embodiments facilitate the installation of a font by providing the user with an install icon in proximity to the preview display of the font. When the user selects the install icon, these embodiments then launch an application that automatically installs the font in the appropriate location on the computer system. Alternatively, some embodiments provide the user with a list of locations to install the font, when the user selects the install icon. Once the user specifies the installation location, these embodiments then install the font in this location.

Before or after installing a font, some embodiments determine whether an identical font is already installed on the computer system. If so, these embodiments display an indication that the identical font is already installed on the computer system.

III. EVENT FLOW

FIG. 1 illustrates an event-flow process of some embodiments of the invention. In these embodiments, the invention is employed to preview and install an asset in a computer system. In some embodiments, the events illustrated in FIG. 1 are performed by more than one software module of a computer system.

The event-flow diagram of FIG. 1 will be described below by reference to examples illustrated in FIGS. 2-6. In these examples, the asset that is being previewed is a font. These figures and the description of these figures present numerous specific GUI elements (e.g., windows, buttons, displays, etc.) for implementing several embodiments of the invention. However, one of ordinary skill will realize that the invention can be practiced without these specific elements.

Figure 2:
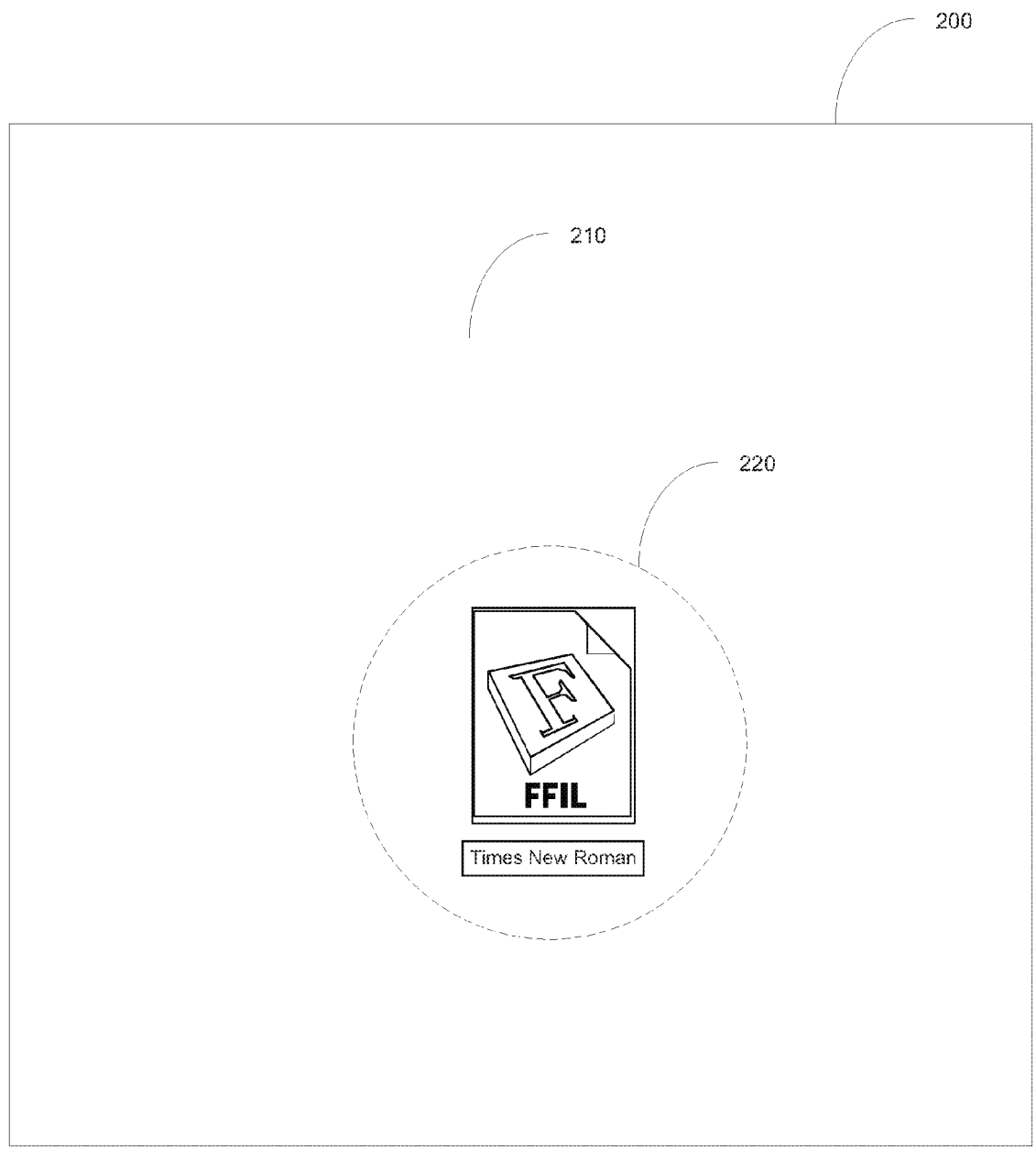
FIG. 2 illustrates a portion of a GUI of several embodiments of the invention.

FIG. 2 illustrates a portion of a GUI 200 that includes a desktop 210, and a font file 220. The font file 220 is a selectable object (e.g., an icon) in the GUI 200. The font file 220 contains information about a font (e.g., the Times New Roman font). Within the font file, there are several ways to represent fonts. One way is to store font data in bit-mapped format. In bit-mapped format, every character is represented by an array of dots. Also, each font character is represented by its own data, even if for example, the typeface is the same. Another way to store font data is in a vector format. In vector format, the outline of each character is defined by geometric shape. An advantage of vector format over bit-mapped format is that the vector format is scalable. This means that, unlike the bit-mapped format, the same data can be used to represent fonts of different sizes.

The font file 220 has been copied to the computer system but may not have been installed on the computer system. A font can be copied to a location (e.g., to a folder or desktop) on a computer system in a number of different ways. For instance, at times, a font is downloaded over a network. Alternatively, a font can be copied from a removable storage medium, such as a CD.

Regardless of how an asset is received by the computer system, the event-flow process 100 of FIG. 1 allows a user to preview the asset without having to install it on the computer system. As shown in this figure, the event flow starts when a user selects (at 110) an asset for preview. A user can select an asset for preview in several different ways. For instance, in some embodiments, a user selects a font resource by moving a cursor over the font resource and performing a double-click operation.

Once an asset has been selected (at 110) for preview, the process 100 (at 120) opens a preview window in the graphical user interface. The process then displays (at 120) a preview presentation in the preview window without first installing the asset on the computer system.

Figure 3:
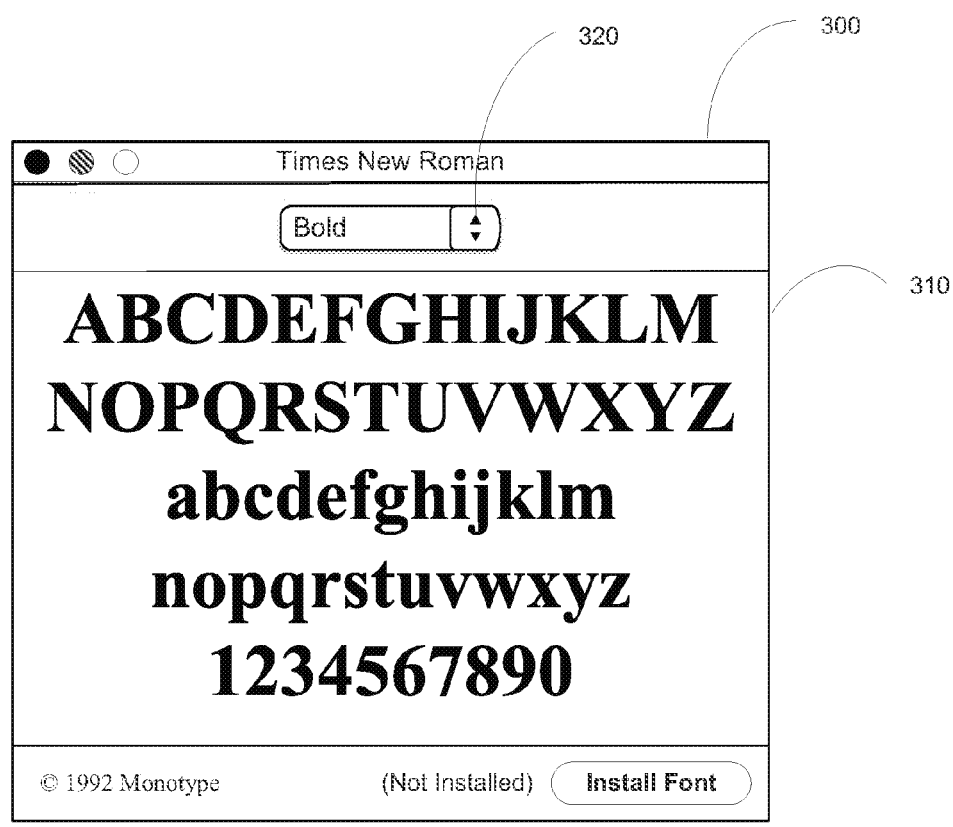
FIG. 3 illustrates a portion of a GUI for previewing an asset.

FIG. 3 illustrates an example of such a preview operation. Specifically, this figure illustrates a preview window 300 that has been opened in the graphical user interface 200 after a user has selected the font resource 220 for preview. The window 300 includes a viewing section 310 for displaying one or more presentations of the font resource 220.

The window 300 further includes a menu section 320 for modifying an attribute relating to the presentation of the font resource 220. In this example, the attribute is the font style, which includes the styles Italic, Regular, Bold, and Bold Italic. Also, in this example, the menu section 320 is a pull down menu that allows the user to select one of the font styles for the font presentation that is displayed in the preview window. In FIG. 3, the menu section 320 indicates that the current font style of the font resource 220 is a bold typeface. Accordingly, the viewing section 310 displays a presentation of the font resource 220 in a bold typeface. The window 300 further includes an installation button 330 for installing the font resource being previewed on the computer system.

Figure 4:
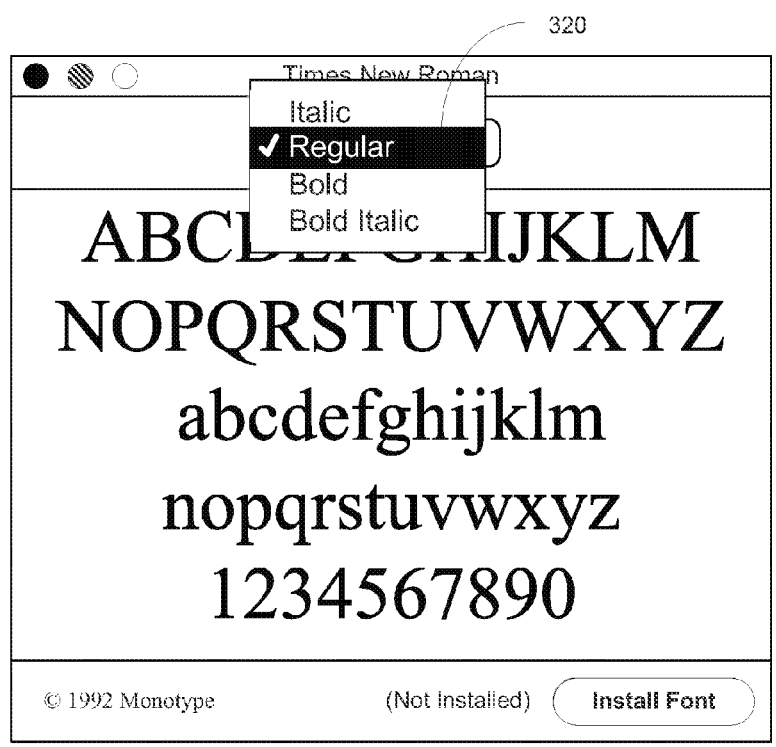
FIG. 4 illustrates a portion of a GUI for previewing an asset with a menu selected.

After a preview presentation of the asset 220 is displayed (at 120) in a preview window, the process 100 transitions to 130, where it waits for user input. As shown in FIG. 1, the process transitions from 130 to 140 when it receives a request to modify a presentation attribute of the asset. For instance, FIG. 4 illustrates an example where the user has opened the drop-down menu section 320 and changed the font style for the preview presentation of the font resource 220 from Bold to Regular.

Figure 5:
FIG. 5 illustrates a portion of a GUI for previewing an asset with a different view of an attribute of the asset.

At 140, the presentation attribute of the asset is modified according to the request. The presentation of the asset in the preview window is then modified (at 140) according to the modification of the presentation attribute. FIG. 5 illustrates an example of changing the presentation of the font resource 200. Specifically, this figure illustrate the viewing section 310 of the preview window 300 as displaying the presentation of the font resource 200 in a Regular font style, in accordance to the font style change previously illustrated in FIG. 4. FIG. 5 also illustrates in the menu section 320 that the Regular font style is the current preview font style. Once the process modifies the preview of the presentation of the asset in the preview window, the process transitions back to 130 to wait for the next user input.

The process 100 loops through 140 several times when the user makes several requests to modify of the presentation attribute. Each time the process loops through 140 it changes the preview presentation in accordance with the user's requested modification. In some embodiments, the user can change more than one presentation attribute of the preview presentation. For instance, in the font installation example, some embodiments allow the user to change not only the font style but also the font size of the presentation in the preview window. By allowing the user to repeatedly examine different preview presentations of an asset, the process 100 allows a user to robustly explore an asset before deciding to install it.

When the process receives (at 130) a user request to install a previewed asset, the process determines (at 150) whether it has previously installed the asset. If not, the process installs (at 160) the asset. In some embodiments, the process 100 launches another application to install the asset. For instance, in some embodiments, the process 100 launches a font application (e.g., a Font Book application) to install a font resource that it previously previewed. The process uses one of the known techniques in the art for installing a font on a computer. In some embodiments, the installation entails copying the font resource 220 from its current location on the computer system to a folder where other installed font resources are located. After installing the asset at 160, the process 100 terminates.

Figure 6:
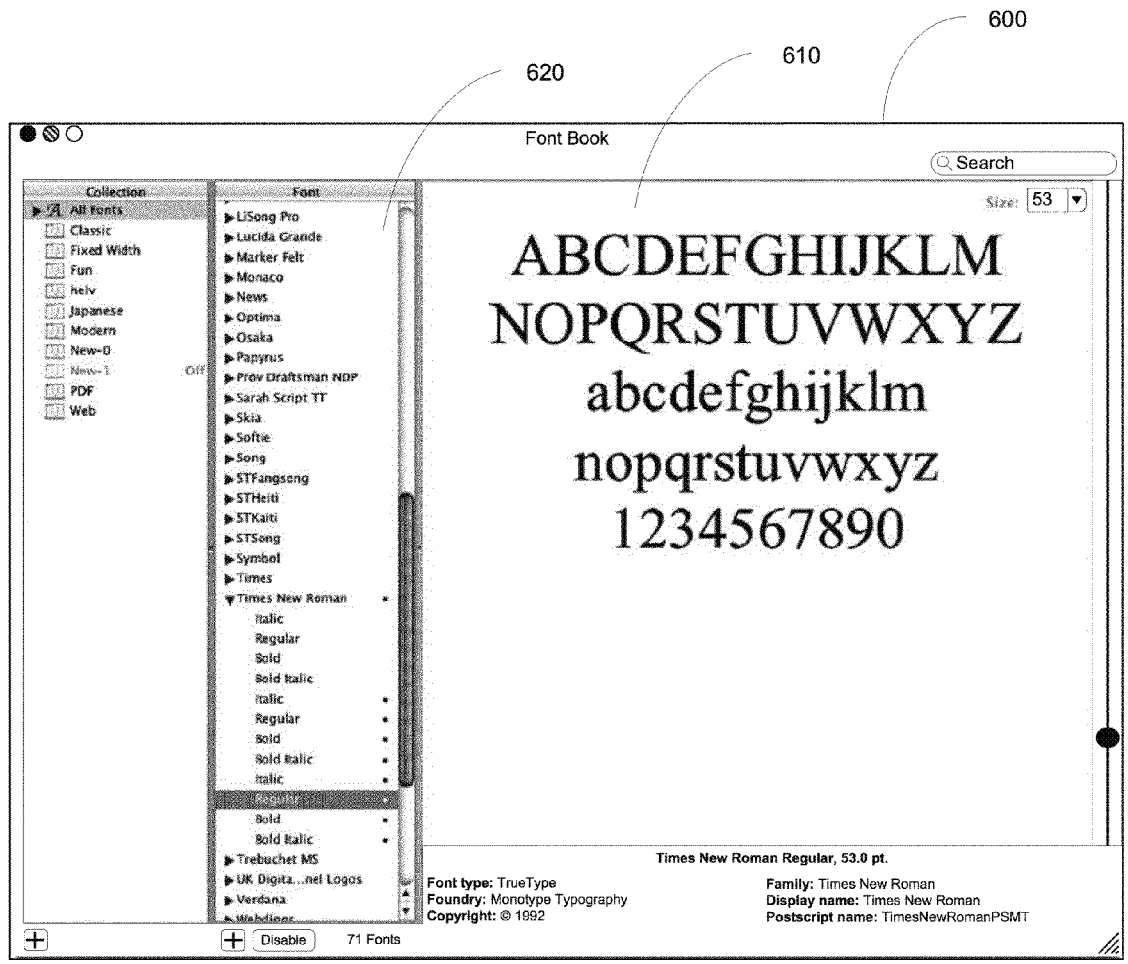
FIG. 6 illustrates a GUI with a window once the asset has been installed on the computer system.

Once the font resource 220 is installed, the font installing application presents a window that displays the installed font resources. FIG. 6 illustrates an example of such a window. This window is displayed by the Font Book application. This window includes a font viewing section 610 that displays a presentation of the font resource 220, which has now been installed on the computer system. The font window 600 further includes a font listing section 200 for displaying a list of installed font resources, including the font resource 220.

When the process determines (at 150) that it has previously installed the asset, the process transitions to 170. At 170, the process installs the asset again. As before, the process can provide (at 170) a preview of the installed asset in a preview window, such as the font-installation preview window 300. In some embodiments, the process 100 also provides (at 170) a visual clue regarding the duplicate installation of the asset.

For instance, in the font-installation example discussed above, the Font Book application determines (at 150) that the font resource 220, representing the Times New Roman font, was previously installed. Hence, it transitions to 170, where it installs this resource one more time. At 170, the Font Book application indicates to the user that there is more than one copy of a Times New Roman font installed on the computer system. Specifically, as illustrated in FIG. 6, the Font Book application lists the Times New Roman font styles again as installed font styles in its listing display 620 of installed fonts, and places a dot next to each Times New Roman font style that has been installed more than once.

After 170, the process terminates. The process also terminates when while waiting at 130, it receives a user's request to terminate the previewing of an asset.

The process 100 of FIG. 1 and the examples of FIGS. 2-6 conceptually illustrate one manner for installing fonts. One of ordinary skill will realize that other embodiments install fonts differently. For instance, some embodiments might not provide a preview of a font, but instead simply install a font in an appropriate location. These embodiments can automatically install the font directly or indirectly through another application (e.g., the Font Book application).

Figure 7:
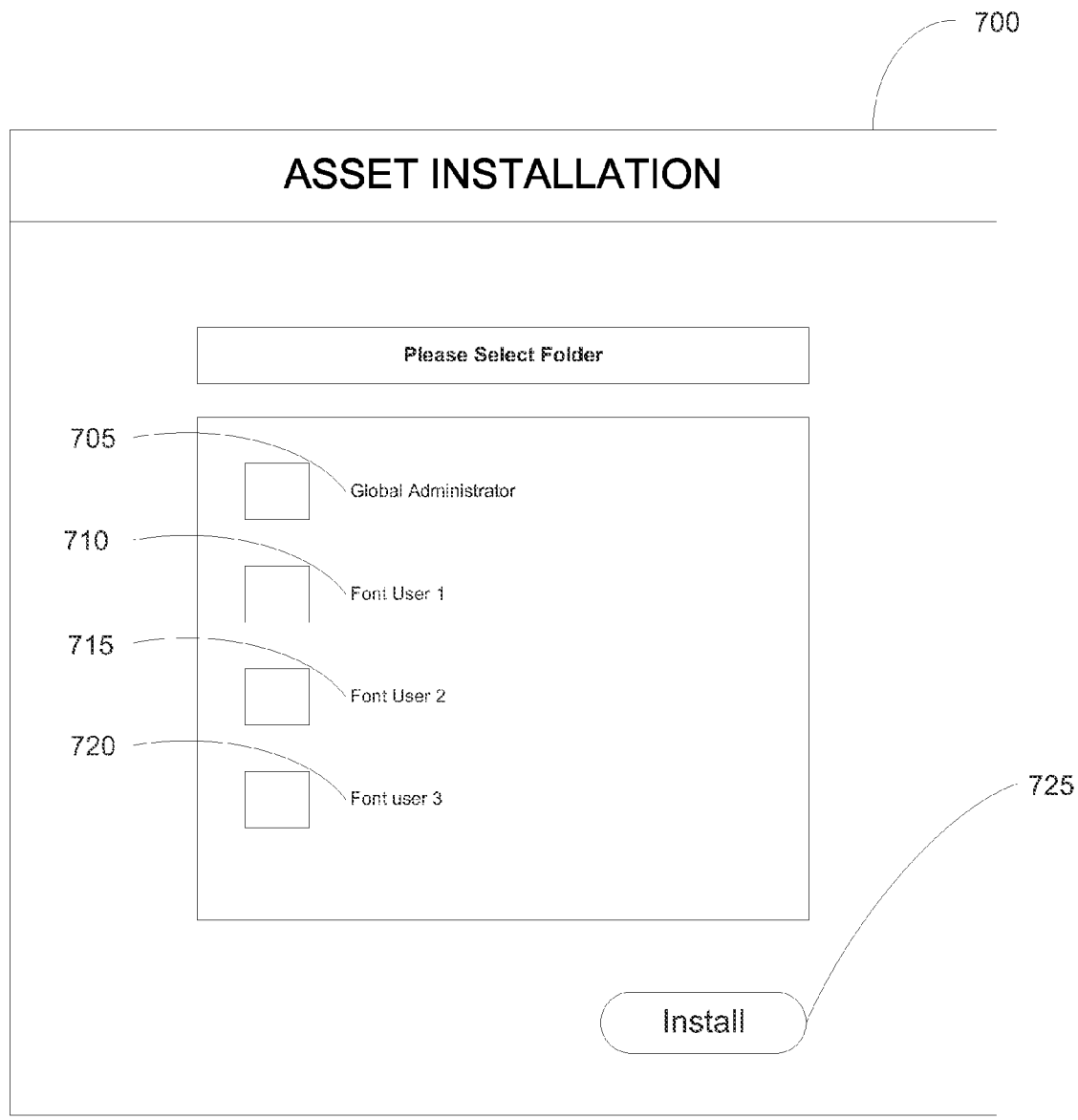
FIG. 7 illustrates a block diagram of a GUI with an option to install asset in different folders.

Alternatively, other embodiments present a user with a list of folders to install a font, once a user selects a font file for installation. FIG. 7 illustrates an example of such a presentation. In this example, a window 700 provides a user with four possible folders 705-720 to install a font. The user can select one of these folders (e.g., by clicking on one of these folders) and then select the install icon 725 to install the font in the selected folder.

Before presenting the user with the list of installation folders, some embodiments provide the user with an opportunity to preview a font before installation. Other embodiments simply provide the list of installation folders when the user selects a font file that is not in one of the installation folders.

The process 100 was described above by reference to a font-installation example. This process, however, can be used to preview and install many other assets on the computer system. For instance, this process can be used to preview and install screen savers. In some embodiments, such a process would allow the user to modify attributes of the screen saver, such as its speed effects, etc.

Other assets employed in other embodiments include any resource that has an audible or visual presentation that a user might wish to preview before installing the resource on the computer. Examples of such assets include sounds, pictures, etc. The invention can also be used to automatically install an asset that does not contain code (i.e., an asset that is not executable).

IV. COMPUTER SYSTEM

Figure 8:
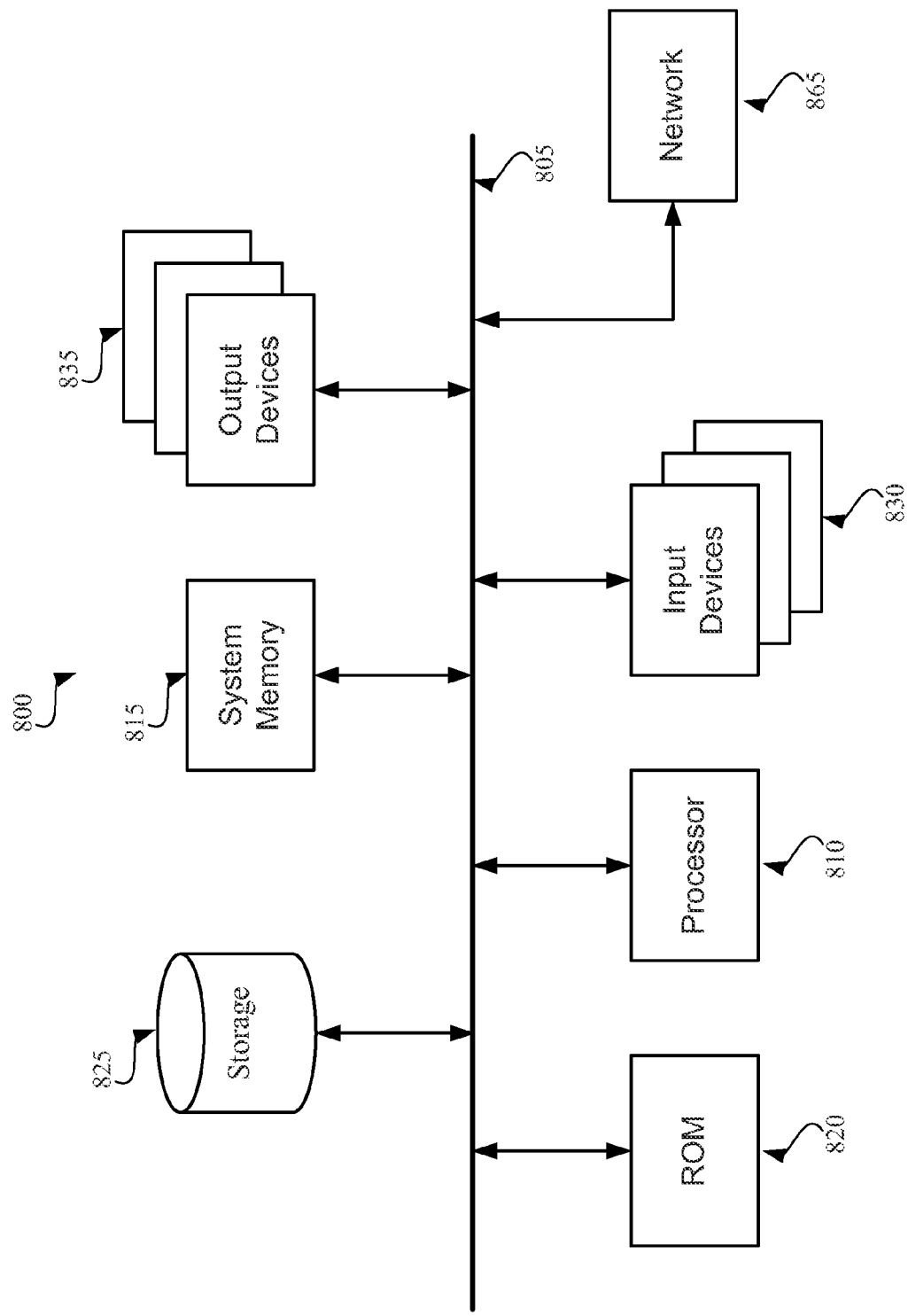
FIG. 8 illustrates a block diagram of a computer system.

FIG. 8 presents a computer system with which one embodiment of the invention is implemented. Computer system 800 includes a bus 805, a processor 810, a system memory 815, a read-only memory 820, a permanent storage device 825, input devices 830, and output devices 835. The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825.

From these various memory units, the processor 810 retrieves instructions to e3cute and data to process in order to e3cute the processes of the invention. The read-only-memory (ROM) 820 stores static data and instructions that are needed by the processor 810 and other modules of the computer system.

The permanent storage device 825, on the other hand, is read-and-write memory device. This device is a non-volatile memory unit that stores instruction and data even when the computer system 800 is off. Some embodiments of the invention use a mass-storage device (such as a magnetic or optical disk and its corresponding disk drive) as the permanent storage device 825.

Other embodiments use a removable storage device (such as a floppy disk or Zip® disk, and its corresponding disk drive) as the permanent storage device. Like the permanent storage device 825, the system memory 815 is a read-and-write memory device. However, unlike storage device 825, the system memory is a volatile read-and-write memory, such as a random access memory. The system memory stores some of the instructions and data that the processor needs at runtime. In some embodiments, the invention's processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keyboards and cursor-controllers. The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet) or a network of networks (such as the Internet). Any or all of the components of computer system 800 may be used in conjunction with the invention. However, one of ordinary skill in the art would appreciate that any other system configuration may also be used in conjunction with the present invention.

One of ordinary skill will realize that the above-described embodiments have numerous advantages. For instance, as described above, some embodiments provide a user with an ability to preview an asset before installing it. This ability saves the user time in deciding whether to install an asset and reduces the instances the user has to uninstall a feature that the user no longer desires. Also, some embodiments automatically install a font without requiring a user to specify a particular location for the installation.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. In a graphical user interface for a computer system, a method for assisting in an installation of one individual font, the method comprising:
   receiving, at the computer system, a file comprising information for only the individual font;
   displaying an icon that represents the file, said icon comprising an image component, wherein said icon is placeable and viewable on a desktop of said computer system, wherein said desktop comprises a display area below any window;
   receiving a selection of said icon;
   in response to receiving the selection of the icon, presenting a preview of the font in a new display area without installing the font on the computer system;
   receiving a request for modifying an attribute of the font;
   in response to receiving the request for modifying the attribute of the font, presenting the preview of the font with the attribute modified without installing the font on the computer system;
   receiving a request to install the font; and
   installing the font on the computer system in response to receiving said request to install the font.

2. The method of claim 1, wherein the preview of the font is used to assist a user of the computer system in determining whether to install the font.

3. The method of claim 1, wherein installing the font on the computer system comprises copying the font to an appropriate folder.

4. The method of claim 3, wherein the appropriate folder is a folder that comprises other installed fonts.

5. The method of claim 3, wherein said copying occurs without receiving a selection of said appropriate folder from a user of said computer system.

6. The method of claim 1, wherein the attribute of the font is a font typeface.

7. The method of claim 1, wherein the attribute of the font is a font size.

8. The method of claim 1, wherein the file does not comprise executable code.

9. The method of claim 1, wherein the font is installed when the font is usable in a first application stored on the computer system that is different than a second application that presents the preview of the font.

10. The method of claim 1, wherein presenting said preview comprises providing a visual cue that the font is not installed.

11. The method of claim 1, wherein said receiving the file comprises copying the file from a computer readable medium.

12. The method of claim 1, wherein said receiving the file comprises downloading the file over a network.

13. In a graphical user interface ("GUI") for a computer system, a method for assisting in an installation of one single font, the method comprising:
    receiving, at the computer system, a file comprising information for only the single font without installing said font on the computer system;
    displaying, in said GUI, an icon that represents the file, said icon comprising an image component, wherein said icon is placeable and viewable on a desktop of said computer system, wherein said desktop comprises a display area below any window;
    receiving a selection of said icon;
    in response to receiving the selection of the icon, displaying a preview of the font in a new display area without installing the font on the computer system;
    receiving a request for modifying an attribute of the font;
    in response to receiving the request for modifying the attribute of the font, displaying the preview of the font with the attribute modified without installing the font on the computer system; and
    displaying a user selectable object in the GUI near the displayed preview, the user selectable object for allowing a user to request installation of the font.

14. The method of claim 13 further comprising:
    receiving a selection of the user selectable object; and
    automatically installing the font after receiving the selection of the user selectable object.

15. The method of claim 13 further comprising:
    receiving a selection of the user selectable object;
    determining whether an identical font is already installed on the computer system; and
    in response to determining that the identical font is already installed on the computer system, displaying an indication that the identical font is already installed on the computer system.

16. The method of claim 13 further comprising:
    receiving a selection of the user selectable object;
    displaying a list of locations to install the font after receiving the selection of the user selectable object;
    receiving a selection of one location from the list of locations; and
    installing the font in the selected location.

17. The method of claim 13, wherein the file comprises data stored in a vector format.

18. The method of claim 11, wherein said icon is for display on a desktop of said GUI, wherein said desktop comprises a display area below any window.

19. A readable storage medium storing a computer program executable by at least one processor, the computer program for providing a graphical user interface ("GUI") for facilitating an installation of a single font on a computer system, the GUI comprising:
    a desktop comprising a display area below any window for displaying an icon that is representative of only the single font;
    a window for presenting a preview of the font without installing the font on the computer system when the icon that is representative of the font is selected;
    at least one first user selectable object for allowing a user to request the installation of the font; and
    at least one second user selectable object for receiving a request to modify an attribute of the font, wherein when a user selects the second user selectable object to modify the attribute of the font, the window presents the preview of the font with the attribute modified without installing the font on the computer system.

20. The readable storage medium of claim 19, wherein the font is a font that is not installed on the computer system.

21. The readable storage medium of claim 19, wherein a selection of the first user selectable object automatically installs the font.

22. A readable storage medium storing a computer program for assisting in an installation of a single font on a computer system, the computer program executable by at least one processor, the computer program comprising:
   a set of instructions for receiving, at the computer system, a file comprising information for only the single font without installing said font on said computer system;
   a set of instructions for displaying an icon that represents the file, said icon comprising an image component, wherein said icon is placeable and viewable on a desktop of said computer system, wherein said desktop comprises a display area below any window;
   a set of instructions for receiving a selection of said icon;
   a set of instructions for presenting, in response to receiving the selection of the icon, a preview of the font in a new display area without installing the font on the computer system;
   a set of instructions for receiving a request for modifying an attribute of the font;
   a set of instructions for presenting, in response to receiving the request for modifying the attribute of the font, the preview of the font with the attribute modified without installing the font on the computer system;
   a set of instructions for receiving a request to install the font; and
a set of instructions for installing the font on the computer system in response to receiving said request to install the font.

23. The readable storage medium of claim 22, wherein the preview of the font is for assisting a user of the computer system in determining whether to install the font.

24. A readable storage medium storing a computer program for assisting in an installation of a single font on a computer system, the computer program executable by at least one processor, the computer program comprising:
   a set of instructions for downloading a file comprising information for only the single font;
   a set of instructions for displaying an icon that represents the file, wherein said icon is placeable and viewable on a desktop of said computer system, wherein said desktop comprises a display area below any window;
   a set of instructions for receiving a selection of said icon;
   a set of instructions for displaying, in response to receiving the selection of the icon, a preview of the font in a new display area without installing the font on the computer system;
   a set of instructions for receiving a request for modifying an attribute of the font;
   a set of instructions for displaying, in response to receiving the request for modifying the attribute of the font, the preview of the font with the attribute modified without installing the font on the computer system; and
   a set of instructions for displaying a user selectable object near the displayed preview, the user selectable object for allowing a user to request the installation of the font.

25. The readable storage medium of claim 24, wherein the computer program further comprises:
   a set of instructions for receiving a selection of the user selectable object; and
   a set of instructions for automatically installing the font after receiving the selection of the user selectable object.

26. The computer readable storage medium of claim 24, wherein the computer program further comprises:
   a set of instruction for receiving a selection of the user selectable object;
   a set of instructions for determining whether an identical font is already installed on the computer system; and
   a set of instructions for displaying, in response to determining that the identical font is already installed on the computer system, an indication that the identical font is already installed on the computer system.

27. The readable storage medium of claim 24, wherein the computer program further comprises:
   a set of instruction for receiving a selection of the user selectable object;
   a set of instructions for presenting a list of locations to install the font after receiving the selection of the user selectable object;
   a set of instructions for receiving a selection of one location from the list of locations; and
   a set of instructions for installing the font in the selected location.

28. The readable storage medium of claim 24, wherein the attribute of the font is a font typeface.

29. The readable storage medium of claim 24, wherein the attribute of the font is a font size.

30. The readable storage medium of claim 24, wherein the preview of the font is used to assist the user of the computer system in determining whether to install the font.

31. In a graphical user interface for a computer system, a method for assisting in an installation of a single font, the method comprising:
   downloading a file comprising information for only the single font;
   displaying an icon that represents the file, said icon comprising an image component, wherein said icon is placeable and viewable on a desktop of said computer system, wherein said desktop comprises a display area below any window;
receiving a selection of said icon;
in response to receiving the selection of the icon, presenting a preview of the font in a new display area without installing the font on the computer system; receiving a request for modifying an attribute of the font;
   in response to receiving the request for modifying the attribute of the font, presenting the preview of the font with the attribute modified without installing the font on the computer system; and
   automatically installing the font on the computer system, wherein installing comprises copying the font to an appropriate folder, wherein the appropriate folder is a folder that comprises other installed fonts.

32. A readable storage medium storing a computer program for assisting in an installation of a particular font on a computer system, the computer program executable by at least one processor, the computer program comprising:
   a set of instructions for receiving, at the computer system, a file that comprises information for only the particular font;
   a set of instructions for displaying an icon that represents the file, wherein said icon is placeable and viewable on a desktop of said computer system, wherein said desktop comprises a display area below any window;
   a set of instructions for receiving a selection of said icon;
   a set of instructions for displaying, in response to receiving the selection of the icon, a preview of the particular font in a new display area without installing the particular font on the computer system;
a set of instruction for receiving a request for modifying an attribute of the particular font;
a set of instructions for, displaying, in response to receiving the request for modifying the attribute of the particular font, the preview of the particular font with the attribute modified without installing the particular font on the computer system;
a set of instructions for receiving a selection to install the particular font;
a set of instructions for presenting a list of a plurality of user selectable locations where the particular font is installable;
a set of instructions for receiving a selection of a particular location from the list of user selectable locations, wherein said selection of the particular location is a single click; and
a set of instructions for installing said particular font into said particular location.

33. The readable storage medium of claim 32, wherein the list of user selectable locations comprises a list of user selectable folder locations, wherein the set of instructions for receiving the selection of said particular location comprises a set of instructions for receiving at least one selection of a particular folder location from the list of user selectable folder locations.

34. A readable storage medium storing a computer program for assisting in an installation of a particular font on a computer system, the computer program executable by at least one processor, the computer program comprising:
a set of instructions for receiving, at the computer system, a file that comprises information for only the particular font;
a set of instructions for displaying an icon that represents the file, wherein said icon is placeable and viewable on a desktop of said computer system, wherein said desktop comprises a display area below any window;
a set of instructions for receiving a selection of said icon;
a set of instructions for displaying, in response to receiving the selection of the icon, a preview of the particular font in a new display area without installing the particular font on the computer system;
a set of instruction for receiving a request for modifying an attribute of the particular font;
a set of instructions for displaying, in response to receiving the request for modifying the attribute of the particular font, a preview of the particular font with the attribute modified without installing the particular font on the computer system;
a set of instructions for receiving a selection to install the particular font;
a set of instructions for presenting a list of a plurality of user selectable user accounts on the computer system in which the particular font is installable;
a set of instructions for receiving a selection of a particular user account from the list of user accounts, wherein said selection of the particular user account is a single click; and
a set of instructions for installing said particular font into said particular user account.

35. A method for assisting in installation of a single font, the method comprising:
loading only the single font on a computer system without installing the font;
presenting the font as an icon on a graphical user interface of the computer system, wherein the icon comprises an image component, wherein said icon is placeable and viewable on a desktop of said computer system, wherein said desktop comprises a display area below any window;
receiving a selection of the icon;
in response to receiving the selection of the icon, presenting, in a new display area, a preview of the font that is loaded but not installed on the computer system;
receiving a request for modifying an attribute of the font;
in response to receiving the request for modifying the attribute of the font, presenting the preview of the font with the attribute modified without installing the font on the computer system; and
presenting a user selectable object, which when selected, automatically installs the font.

36. The method of claim 35 further comprising installing the font in an appropriate folder when the user selectable object is selected.

37. The method of claim 35 further comprising starting a first application that manages fonts that are installed on the computer system, wherein the first application is different than a second application that provides the preview of the font.

38. The method of claim 37, wherein the first application is started in order to present a window that comprises a listing of fonts installed in the computer system.

39. The method of claim 35 further comprising presenting a list of a plurality of user selectable user accounts on the computer system in which the font is installable, when the user selectable object is selected.

40. The method of claim 35 further comprising presenting a list of a plurality of user selectable locations where the font is installable, when the user selectable object is selected.

41. The method of claim 35, wherein the attribute is a first attribute of the font, the method further comprising modifying the preview of the font to reflect a change of a second attribute of the font, said second attribute of the font different from the first attribute.

42. The method of claim 41, wherein presenting said preview is in response to a request for modifying the second attribute of the font.

43. A readable storage medium storing a computer program comprising a graphical user interface ("GUI") for assisting in an installation of one individual font on a computer system, said computer program comprising:
a set of instruction for receiving, at the computer system, a file comprising information for only the single font without installing said font on the computer system;
a set of instruction for displaying, in said graphical user interface, an icon that represents the file, said icon comprising an image component, wherein said icon is placeable and viewable on a desktop of said computer system, wherein said desktop comprises a display area below any window;
a set of instruction for receiving a selection of said icon;
a set of instruction for displaying, in response to receiving the selection of the icon, a preview of the font in a new display area without installing the font on the computer system;
a set of instruction for receiving a request for modifying an attribute of the font;
a set of instruction for displaying, in response to receiving the request for modifying the attribute of the font, the preview of the font with the attribute modified without installing the font on the computer system; and a set of instruction for displaying a user selectable object in the GUI near the displayed preview, the user selectable object for allowing a user to request installation of the font.

44. The readable storage medium of claim 43, wherein the computer program further comprises:
   a set of instruction for receiving a selection of the user selectable object; and
   a set of instruction for automatically installing the font after receiving the selection of the user selectable object.

45. The readable storage medium of claim 43, wherein the computer program further comprises:
   a set of instruction for receiving a selection of the user selectable object;
   a set of instruction for determining whether an identical font is already installed on the computer system; and
   a set of instruction for displaying an indication that the identical font is already installed on the computer system in response to determining that the identical font is already installed on the computer system.

46. The readable storage medium of claim 43, wherein the computer program further comprises:
   a set of instruction for receiving a selection of the user selectable object;
   a set of instruction for displaying a list of locations to install the font after receiving the selection of the user selectable object;
   a set of instruction for receiving a selection of one location from the list of locations; and
   a set of instruction for installing the font in the selected location.

47. A method for assisting in an installation of one single font on a computer system, said method comprising:
   downloading a file comprising information for only the single font;
   displaying an icon that represents the file, wherein said icon is placeable and viewable on a desktop of said computer system, wherein said desktop comprises a display area below any window;
   receiving a selection of said icon;
   in response to receiving the selection of the icon, displaying a preview of the font in a new display area without installing the font on the computer system;
   receiving a request for modifying an attribute of the font;
   in response to receiving the request for modifying the attribute of the font, displaying the preview of the font with the attribute modified without installing the font on the computer system; and
   displaying a user selectable object near the displayed preview, the user selectable object for allowing a user to request the installation of the font.

* * * * *

UNITED STATES PATENT AND TRADEMARK OFFICE
CERTIFICATE OF CORRECTION

PATENT NO. : 7,761,811 B1  Page 1 of 1
APPLICATION NO. : 10/874829
DATED : July 20, 2010
INVENTOR(S) : Imran Chaudhri It is certified that error appears in the above-identified patent and that said Letters Patent is hereby corrected as shown below:

In column 2, line 37, delete "controller):" and insert -- controller). --, therefor.

In column 8, line 50, in Claim 18, delete "claim 11" and insert -- claim 13 --, therefor.

In column 10, line 3, in Claim 26, after "the" delete "computer".

In column 10, lines 44-45, in Claim 31, delete "font on the computer system; receiving a request for modifying an attribute of the font;"
and add a line after "system;" by inserting -- font on the computer system;
receiving a request for modifying an attribute of the font; --, therefor.

Signed and Sealed this
Tenth Day of January, 2012

David J. Kappos
*Director of the United States Patent and Trademark Office*